(12) United States Patent
Leaphart

(10) Patent No.: US 6,498,971 B2
(45) Date of Patent: Dec. 24, 2002

(54) APPARATUS FOR DETERMINING STEER ANGLE OF A MOTOR VEHICLE

(75) Inventor: Eldon Gerrald Leaphart, Southfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 106 days.

(21) Appl. No.: 09/805,487

(22) Filed: Mar. 13, 2001

(65) Prior Publication Data

US 2002/0133278 A1 Sep. 19, 2002

(51) Int. Cl.$^7$ ................................................ G06G 7/76
(52) U.S. Cl. .......................... 701/41; 701/42; 180/142; 340/73
(58) Field of Search .............................. 701/41, 42, 48, 701/72; 180/142, 148, 141; 340/73, 56, 55

(56) References Cited

U.S. PATENT DOCUMENTS

| | | | |
|---|---|---|---|
| 4,633,214 A | * 12/1986 | Miyata et al. | ............. 307/10.1 |
| 4,856,607 A | * 8/1989 | Sueshige et al. | ............ 180/422 |
| 5,790,966 A | 8/1998 | Madau et al. | ................. 701/41 |
| 5,857,160 A | 1/1999 | Dickenson et al. | ........... 701/41 |

* cited by examiner

Primary Examiner—William A. Cuchlinski, Jr.
Assistant Examiner—Arthur D. Donnelly
(74) Attorney, Agent, or Firm—Robert M. Sigler

(57) ABSTRACT

A steering angle sensor providing an output signal indicating relative position within a full rotation, such as a relative dual track steering sensor, provides a signal to a digital processor coupled to a non-volatile memory for storing retained values of a centered vehicle steer angle, a rotation count and a mounting bias angle. The processor derives three test steer angle values utilizing, respectively, (1) the retained rotation count, (2) one greater than the retained rotation count and (3) one less than the retained rotation count and chooses as an initialized steer angle one of the three test steer angles that differs from the retained value of a centered vehicle steer angle by less than a first calibration value. If such an initialized steer angle is found, the processor verifies that the initialized steer angle differs from an estimated steer angle derived in response to signals from the vehicle yaw rate sensor and lateral acceleration sensor by less than a second calibration value less than the first calibration value and, if so, accepts the verified initialized steer angle as the centered vehicle steer angle. If not, the processor preferably reverts to a full recalibration without use of the retained values in the non-volatile memory. Preferably, the first calibrated value is 180 rotational degrees, so that the initialized steering angle value may be assumed to be within the same rotation as the centered angle.

5 Claims, 6 Drawing Sheets

APPARATUS FOR DETERMINING STEER ANGLE OF A MOTOR VEHICLE

TECHNICAL FIELD

The technical field of this invention is the determination of a steer angle of a motor vehicle with a steer angle sensor.

BACKGROUND OF THE INVENTION

The use of steer angle sensors on motor vehicles is increasing due to their use in vehicle dynamic stability systems, steering control systems and other systems requiring a knowledge of vehicle steer angle. Most practical high resolution steer angle sensors are incorporated on the vehicle steer column to detect rotation of the column.

One such sensor is a digital pulse generator such as that described in U.S. Pat. No. 5,857,160 to Dickinson et al, issued Jan. 5, 1999, as well as many other patents and published documents. This type of sensor outputs pulses corresponding to rotations of the shaft through predetermined angles, with some method of determining the direction of the rotation. These pulses are used to increment a counter in a first direction for one rotational direction and a second and opposite direction for the opposite rotational direction. Such sensors generally provide a relative rotational position only, with no inherent absolute rotational position of the shaft; and they do not generally inherently provide a roll-over signal for multiple rotations. Although the counter contents of a sensor that has been initialized and synchronized may be saved in a non-volatile memory for use when the vehicle is next started, this value is not fully trustworthy due to the fact that the steer angle could have been changed between periods of vehicle use when the change was not detected. Thus, such a sensor must generally be recalibrated at the beginning of each vehicle driving cycle before it will indicate true steer angle. The aforementioned U.S. Pat. No. 5,857,160 describes a method incorporating such a recalibrating or centering function responsive to vehicle yaw rate. But the centering methods described in this patent and others require time to complete, during which systems dependent on a steer angle sensor output are generally not activated.

Another type of steer angle sensor in use on motor vehicles provides an indicated position output. An example is a dual track, resistive sensor. It includes two brushes maintaining a fixed 90 degree separation as they rotate in contact with and relative to a circular, electrically resistive track provided with a fixed DC voltage across opposite diagonal points on the track. The output signals from the sensor are two voltages varying with shaft rotational position but maintaining a fixed 90 degree relationship with each other. Such signals provide an indicated rotational position of the shaft within a range of 360 rotational degrees, as well as rotational direction, that offers the opportunity to modify the method described in the aforementioned U.S. Pat. No. 5,857,160 to provide quicker centering of the sensor, in most cases without full recalibration.

SUMMARY OF THE INVENTION

The apparatus of the invention provides an accurate centered steering angle signal from a steering angle sensor providing an output signal indicating relative position within a full rotation, such as a relative dual track steering sensor. The apparatus performs a two step process in which the sensor output signal is initialized in the first step and verified in the second step.

The apparatus includes a non-volatile memory for storing retained values of a centered vehicle steer angle, a rotation count and a mounting bias angle and digital and digital processing means responsive to an activating signal to perform the following steps:

(a) deriving three test steer angle values as the sum of the retained value of a mounting bias angle, a value derived from the steer angle signal and a rotation angle derived from, respectively for the three test steer angle values, (1) the retained rotation count, (2) one greater than the retained rotation count and (3) one less than the retained rotation count;

(b) choosing as an initialized steer angle one of the three test steer angles that differs from the retained value of a centered vehicle steer angle by less than a first calibration value; and (c) verifying that the initialized steer angle chosen in step (b) differs from an estimated steer angle derived in response to signals from the vehicle yaw rate sensor and lateral acceleration sensor in a first process by less than a second calibration value less than the first calibration value and, if so, accepting the verified initialized steer angle as the centered vehicle steer angle.

Preferably, the first calibrated value is 180 rotational degrees, so that the initialized steering angle value may be assumed to be within the same rotation as the centered angle. The second step is thus only a verification of the initialization results and thus provides the benefits of quicker centering of the sensor as compared with the full recalibration process, which does not use the retained values from the non-volatile memory. The recalibration process is preferably retained as a backup in case an initialized and verified steer angle is not found in steps (a) through (c).

DESCRIPTION OF THE PREFERRED EMBODIMENT

Figure 1:
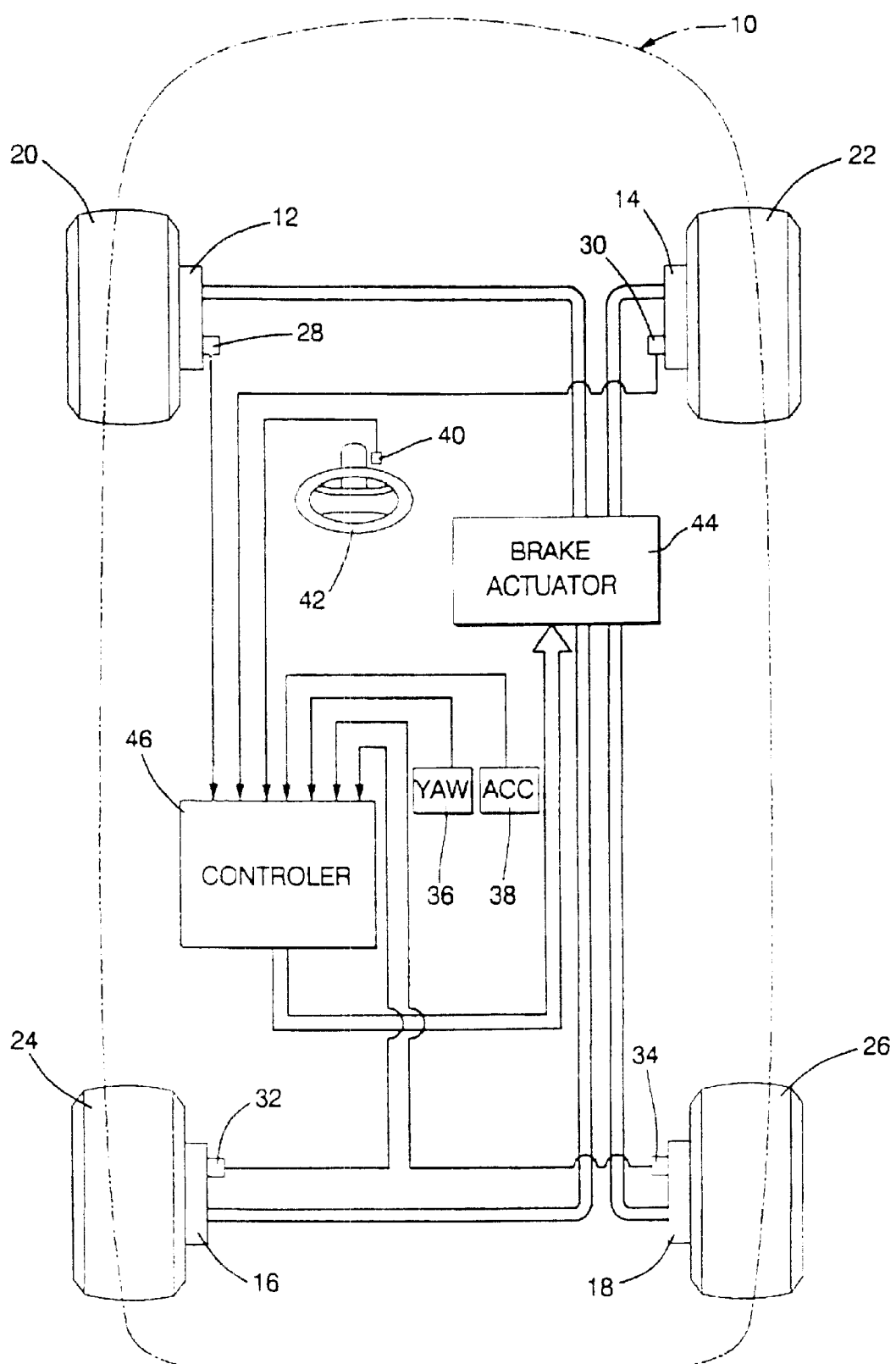
FIG. 1 is a schematic diagram of a vehicle with apparatus and method according to this invention.

Referring to FIG. 1, a vehicle 10 includes four wheels 20, 22, 24 and 26, having a associated wheel brakes 12, 14, 16 and 18, respectively, and associated wheel speed sensors 28, 30, 32 and 34, respectively. The wheel speed sensors provide wheel speed indicating information to a microprocessor based controller 46. Vehicle 10 also includes a steer angle sensor 40 coupled to a steering wheel 42 through a steering column or other rotating part of the steering gear, not shown. Steer angle sensor 40 is an indicated position type rotational sensor, preferably a dual track, resistive sensor having two brushes maintaining a fixed 90 degree separation as they rotate in contact with and relative to a circular, electrically resistive track provided with a fixed DC voltage across opposite diagonal points on the track. The output signals from the sensor—two voltage signals varying with shaft rotational position but maintaining a fixed 90 degree relationship with each other—are also provided to controller 46. Controller 46 also receives signals from a yaw rate sensor 36 and a lateral acceleration sensor 38. Controller 46 may control a brake actuator or actuators 44 for controlling wheel brakes 12–18 or any other chassis related function of the vehicle, including vehicle stability, steering or suspension. Further details of the vehicle and its equipment may be found in the aforementioned U.S. Pat. No. 5,587,160.

Figure 2:
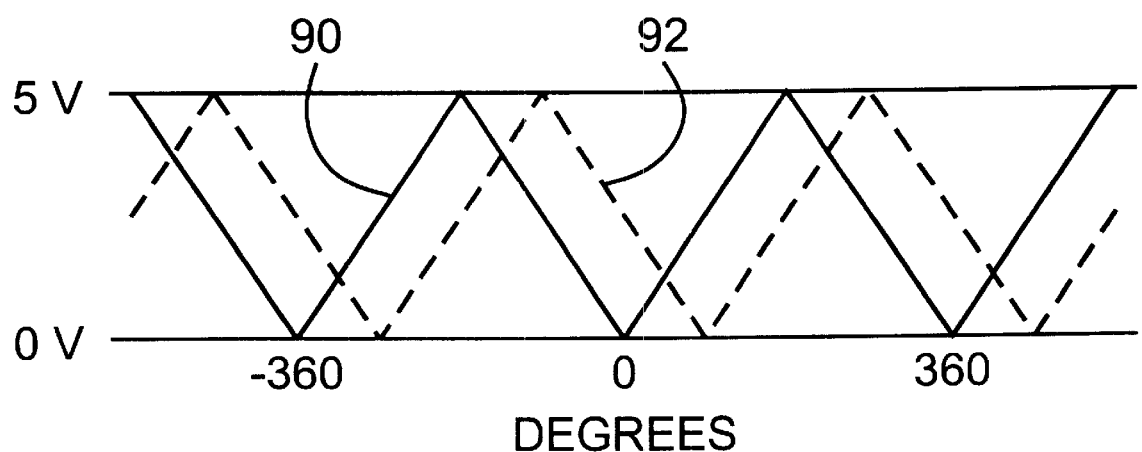
FIG. 2 is a waveform illustrating the output signal voltages of a steer angle sensor as a function of steer angle.

Steer angle sensor 40 provides a pair of voltage output signals, each of which varies as shown in FIG. 2, with an essentially linear change from a low voltage (such as ground) to a high voltage (such as five volts) through a 180 degree rotation of the sensor followed by an essentially linear change from the high voltage back to the low voltage through an additional 180 degree rotation of the sensor. Thus a full rotation of the sensor brings the output signal back to its starting point. The two signal waveforms are identical in shape; but one is shifted from the other by 90 degrees. Each rotational angle within a full rotation is thus uniquely identified by a pair of signal values representing the voltages output by the two brushes in the corresponding rotational position. Of course, most vehicle steering columns require more than one full rotation across the full range of allowable steer angles ("lock-to-lock"); and the signal pattern will repeat as the sensor "rolls over" to the next 360 degrees. For example, in a vehicle requiring three full turns lock-to-lock, and assuming a conventional definition of the steer center position (straight ahead) as zero degrees, the pattern will run through three full cycles as the steer angle varies from 540 degrees to −540 degrees lock-to-lock. Such an arrangement is shown in FIG. 2, with solid line 90 and dashed line 92 illustrating the two output signals over the full range of 540 to −540 degrees. Thus, a true, synchronized value of steer angle within the full 1,080 degree range must include a reference datum (in this embodiment, a rotation number) indicating the specific 360 degree rotational range in addition to the signal outputs indicating the rotational position within that specific range. In addition, the sensor may not be perfectly aligned with the wheels as mounted on the vehicle; in fact, in many cases there is no attempt to align the sensor itself in the vehicle assembly process, as long as its rotational alignment is prevented from changing. Instead, the true steer angle includes a mounting bias (in degrees). Finally, the true steer angle is that which makes the vehicle go straight; and this can be affected in vehicle dynamic behavior by external factors interacting with the vehicle. For example, a cross slope in the road surface, such as is found on a crowned road, tends to make a moving vehicle turn slightly; and the vehicle wheels must be turned slightly to cancel this tendency. A cross wind may produce the same effect. In dynamic situations, therefore, a dynamic steer angle bias term may be applied. Thus, the true steer angle is provided by the sum of (1) the sensor indicated steer angle, (2) the product of the rotation count times 360 degrees, (3) the mounting bias and (4) in appropriate circumstances, the dynamic steer angle bias.

Figure 3:
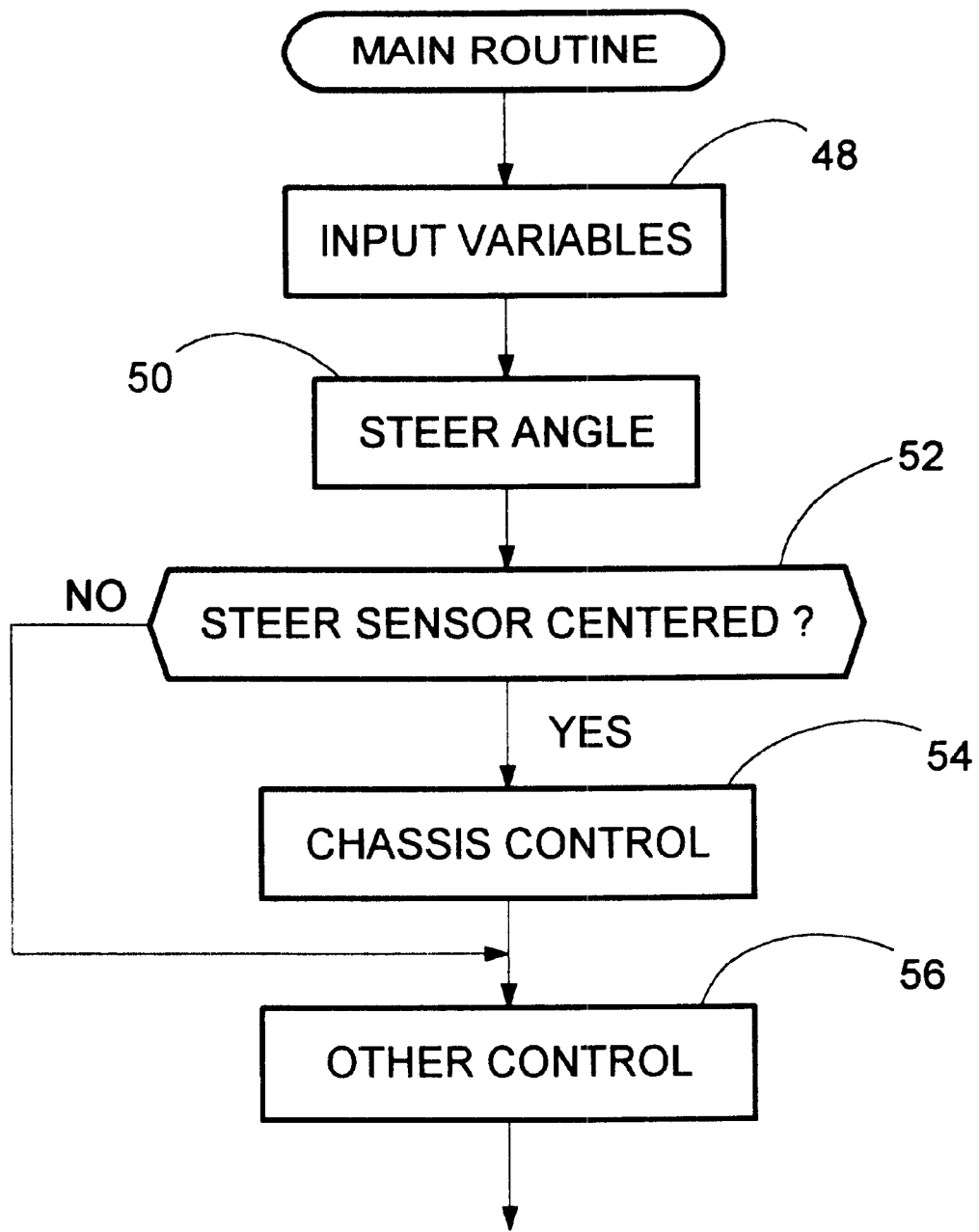
FIGS. 3–6 show flow charts illustrating the operation of the method and apparatus of this invention.

The operation of the method and apparatus of this invention is illustrated with reference to the flow chart of FIGS. 3–6. Referring to FIG. 3, MAIN ROUTINE is run by the microprocessor within controller 46 using commands stored in ROM or EPROM or other alternative memory device. In general, the routine starts and performs required system maintenance and start-up functions of a type known to those skilled in the art. The routine then moves to block 48 where the various sensor information is received and then to block 50 where it calls a subroutine STEER ANGLE, which determines the true, synchronized steer angle.

After performing the functions at block 50, the routine moves to block 52 where it determines whether or not block 50 has completed the function of determining the steering wheel center position, i.e., by checking an appropriate flag, referred to below as the "STEER-CENTER" flag. If, at block 52, the flag is set, the chassis control routines represented by block 54 that require accurate steering wheel position information are enabled. If, at block 52, the appropriate flag is not set, the routine skips the chassis control routines at block 54 and continues to block 56 where other brake or chassis control routines not requiring the centered steering wheel sensor signal may be implemented.

Subroutine STEER ANGLE is basically a two step process for attempting to perform initialization by determining the steering position within any 360 degree interval and the appropriate rotation in the first step and, if this is successful, attempting to perform an abbreviated synchronization in the second step where the output from step one is verified against sensed vehicle dynamic conditions. If and only if both steps are successful, a value has been found that is considered true; and the process is complete. If either is unsuccessful, the control drops back to the default process as described in U.S. Pat. No. 5,857,160.

Figure 4:
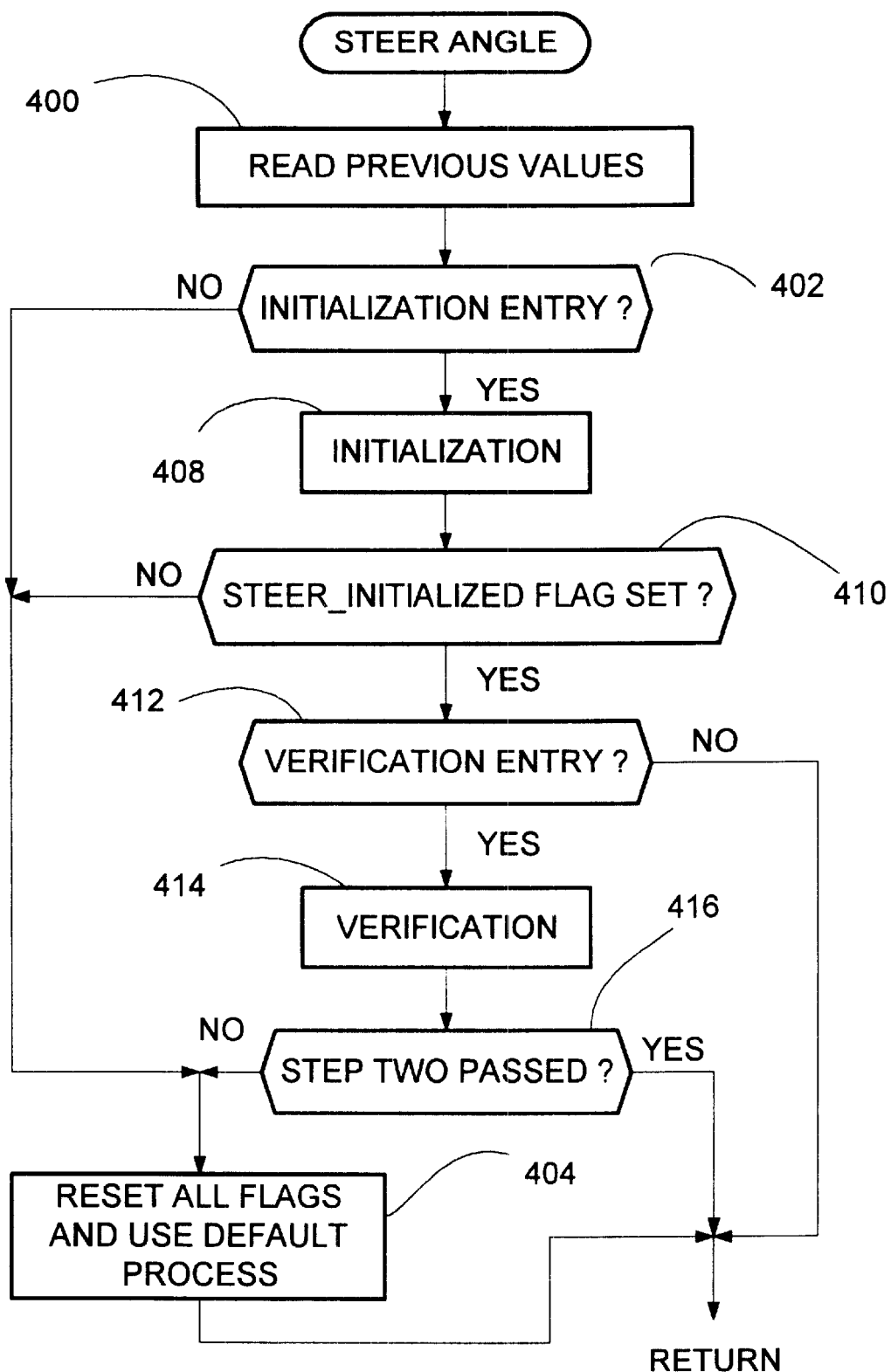

Referring to FIG. 4, subroutine begins at step 400, wherein data stored during the last period of vehicle use is called. For purposes of this description, a period of vehicle use is defined as a time period beginning with the close of a vehicle ignition switch and ending with the opening of the vehicle ignition switch. The recalled data may include the following: (1) the previous value of the steer angle, (2) any initialization method flags, (3) the mounting bias, the previous steer angle bias and the previous rotation counter value. Thus, the values from the last period of vehicle use are available.

The subroutine next tests the validity of step one entry at step 402 by checking one or more initialization method flags to determine if the previous data can be legitimately used to form an initialized value for this period of vehicle use. Such flags might indicate, for example, that initialization has never before been performed, or that the values had been entered by an external tool and not cleared. If any flag indicates that the values are not to be used, the subroutine proceeds immediately to step 404, wherein any flags set in this routine so far are reset and the default process of U.S. Pat. No. 5,857,160 is performed.

If the full default process need not be performed, the subroutine proceeds to step 408, wherein a subroutine INITIALIZATION is called to perform calculate and test certain step one test values of steer angle based on the previous values read in step 400 and the present sensor reading. An assumption is made that movement of the steering wheel during the ignition off period does not exceed +180 degrees or −180 degrees from the previous position. If one of the test values passes the test, the Steer_Initialized flag is set within the subroutine, as described below. At step 410, the Steer_ Initialized flag is checked. If it is set, step one is complete; and the subroutine proceeds to step 412. If it is not set, the program proceeds to step 404 and the default process as described above.

Figure 5:
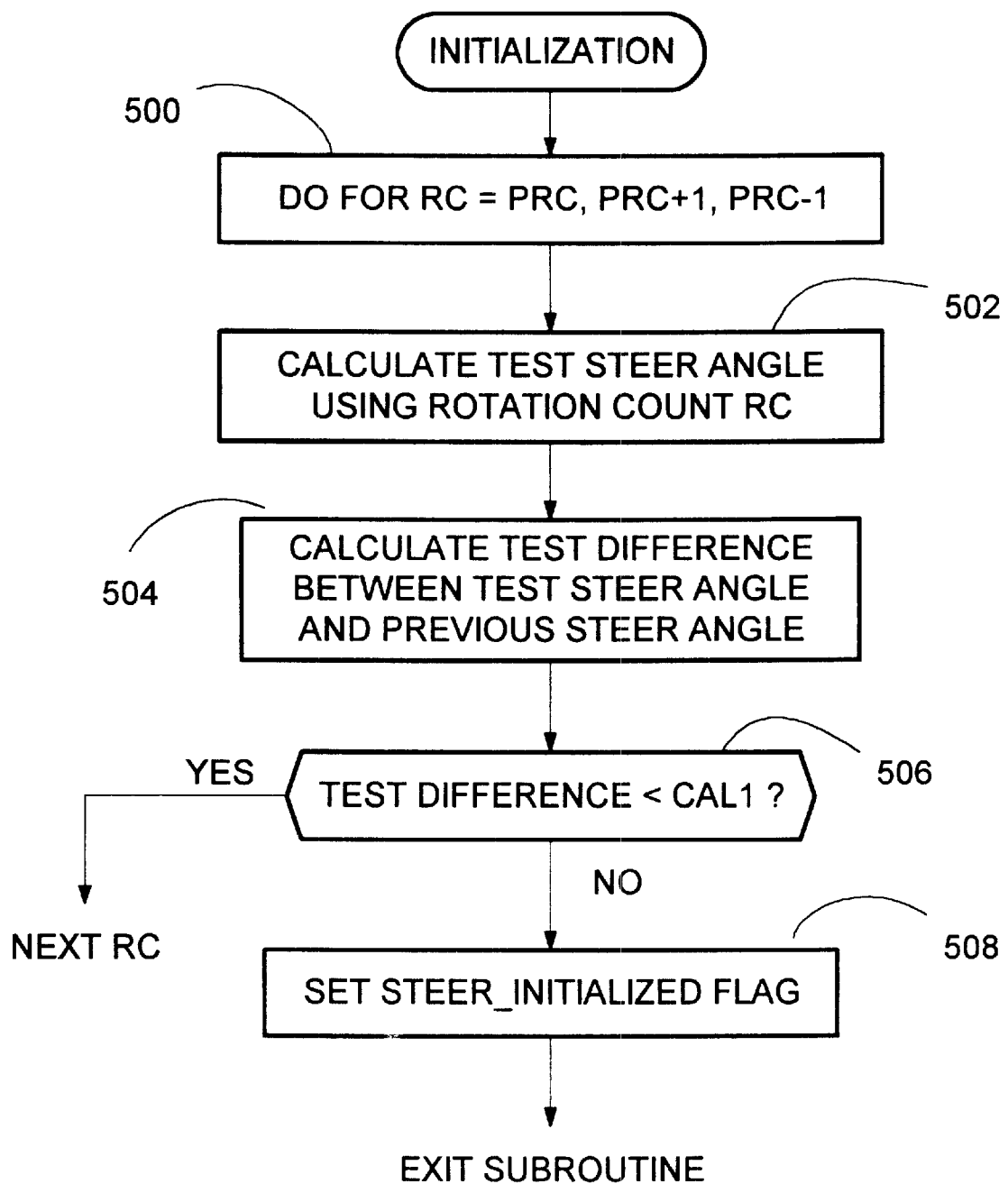

Subroutine INITIALIZATION is illustrated in the flow chart of FIG. 5. It begins at step 500 by calling a DO loop using the following values of a rotation count RC: the previous value PRC read in step 400, PRC +1 and PRC−1. The loop consists of the following steps. In step 502, a value Test Steer Angle is calculated according to the following equation:

Test Steer Angle=Current Sensor Reading +Previous Mounting Bias+Previous Steer Angle Bias+(RC)(360), wherein the value of RC is different in each loop as described. At step 504, the Test Difference between this value and the previous value is determined:

Test Difference=Test Steer Angle−Previous Steer Angle

This Test Difference is then compared at step 506 to a predetermined calibration value CAL1, for example 180 degrees. If it is less, then the Steer_Initialized flag is set at step 508 and the subroutine is exited and returns to subroutine STEER ANGLE from which it was called. If it is not less, the subroutine returns to step 500 for a test with the next value of RC. After the third and last test, if it occurs, the subroutine is exited and returns to subroutine STEER ANGLE from which it was called. Thus, the Steer_Initialized flag will be set if and only if one of the three tested steer angles is within CAL1 degrees of the stored previous value, with the subroutine exited as soon as this is done to avoid unnecessary calculations.

Returning to FIG. 4, if the Steer_Initialized flag is determined at step 410 to be set, subroutine STEER ANGLE proceeds to step 412, wherein step two entry is tested by checking one or more required validity conditions. These validity conditions are:

1. Vehicle Speed exceeds a calibrated value (e.g. 8 kph);
2. Yaw Rate is Centered Flag asserted (The Yaw Rate is preferably derived as described in the aforementioned U.S. Pat. No. 5,857,160; and the use of this flag is explained therein);
3. Vehicle is not moving in reverse. This set of validity conditions is required to obtain an accurate estimate calculated in step 600. If the conditions are not met, the subroutine exits and checks again during the next loop. During this period, the steering angle signal is calculated and updated with subsequent movement, but the synchronization and centered flags will not be set. If they are met, the next step 414 calls a subroutine VERIFICATION.

Figure 6:
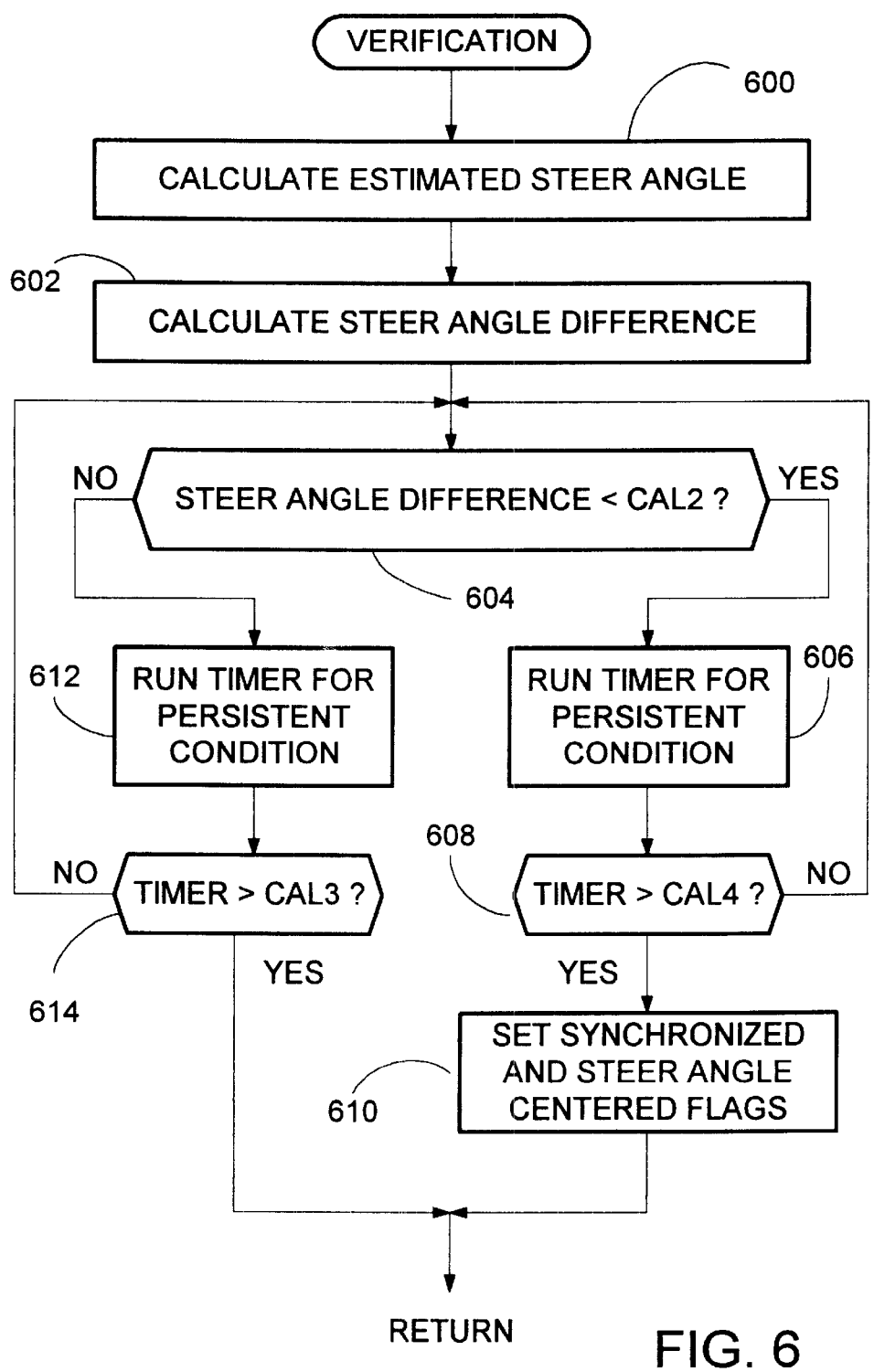

Referring to FIG. 6, subroutine STEP TWO begins at step 600 by calculating a value of an Estimated Steer Angle as a function of vehicle dynamic variables, according to the following equation:

$$\text{Estimated Steer Angle} = K_{gr} * (\text{YAW-RATE} * L/v + u * A_y)$$

where $K_{gr}$ is the Ackerman constant for the vehicle, determined in a manner known to those skilled in the art, L is the wheel base or distance between front and rear wheels, v is the vehicle speed, u is the understeer coefficient for the vehicle and A[y] is the vehicle's lateral acceleration as measured by the lateral acceleration sensor 38. This may only be calculated when vehicle speed v is above a predetermined value and the other criteria of step 412 have been met.

Next, at step 602, the Steer Angle Difference between the Estimated Steer Angle and the retained value of Test Steer Angle is calculated:

$$\text{Steer Angle Difference} = \text{Estimated Steer Angle} - \text{Test Steer Angle}$$

The absolute value of this difference is compared with a calibrated value CAL2 at step 604. This calibrated value may be chosen to be reasonably large, such as e.g. 50 rotational degrees, since it is only a verification of the initialization process using retained values from the last period of vehicle use and a sensor that provides a positional output signal. If it is less than CAL2, a timer is incremented at step 606; and the timer value is compared with a calibrated value CAL3 at step 608. If step 608 indicates a persistent condition, the time CAL3 has not elapsed, the subroutine returns to step 604. When the timer exceeds the calibrated value CAL3, a Synchronized flag and a Steer Angle Centered Flag are both set at step 610 and the subroutine is exited and returns to subroutine STEER ANGLE from which it was called. These flags correspond to the similarly name flags in the aforementioned U.S. Pat. No. 5,857,160; and their setting, along with that of the Steer_Initialized flag, means that the output of steer sensor 42 may be used.

On the other hand, if the Steer Angle Difference is not less than CAL2 at step 604, a timer value is incremented at step 612. The timer value is compared with a calibrated value CAL4 at step 614 and, if it is not greater, the subroutine returns to step 604. But when the timer value is found at step 614 to exceed CAL4, the subroutine is exited without setting either of the aforementioned flags.

Returning to FIG. 4 and subroutine STEER ANGLE, the Steer Angle Centered flag is checked to see if the step two test has been passed. If it has not been set, the test has not been passed; and the subroutine proceeds to step 404 and the default process of U.S. Pat. No. 5,857,160. But if it has been set, the subroutine is exited. In the MAIN ROUTINE, the set Steer Angle Centered flag will result in a "yes" determination at step 52; and the Chassis Control, now free to use the output of steer angle sensor 42, will be activated at step 54. If desired, the default process may still be run in the background as a validation check; and the Steer Angle Bias value may eventually be adjusted as a result. But the Chassis Control will operate with input from steer angle sensor 42 as soon as the process described above sets the Steer Angle Centered flag.

What is claimed is:

1. Apparatus for generating a centered vehicle steer angle sensor signal comprising, in combination:

a vehicle steer angle sensor uniquely responsive to absolute rotational position over a full rotation of a steering shaft to generate a steer angle signal;

a vehicle yaw rate sensor;

a vehicle lateral acceleration sensor;

a non-volatile memory for storing retained values of a centered vehicle steer angle, a rotation count and a mounting bias angle;

digital processing means responsive to an activating signal to perform the following steps:

(a) deriving three test steer angle values as the sum of the retained value of a mounting bias angle, a value derived from the steer angle signal and a rotation angle derived from, respectively for the three test steer angle values, (1) the retained rotation count, (2) one greater than the retained rotation count and (3) one less than the retained rotation count;

(b) choosing as an initialized steer angle one of the three test steer angles that differs from the retained value of a centered vehicle steer angle by less than a first calibration value;

(c) verifying that the initialized steer angle chosen in step (b) differs from an estimated steer angle derived in response to signals from the vehicle yaw rate sensor and lateral acceleration sensor in a first process by less than a second calibration value less than the first calibration value and, if so, accepting the verified initialized steer angle as the centered vehicle steer angle.

2. The apparatus of claim 1 wherein the first calibration value is 180 rotational degrees.

3. The apparatus of claim 2 wherein the second calibration value is greater than 30 degrees.

4. The apparatus of claim 1 wherein the digital processing means alternatively, if no verified initialized steer angle is identified in steps (a) through (c), generates the centered vehicle steer angle by recalibrating the vehicle steer angle sensor responsive to the sensed vehicle yaw rate and lateral acceleration without regard to the retained values of a centered vehicle steer angle, a rotation count or a mounting bias angle in the non-volatile memory.

5. The apparatus of claim 4 wherein the first calibration value is 180 rotational degrees.

* * * * *